US009685826B1

(12) United States Patent
Bhatti

(10) Patent No.: US 9,685,826 B1
(45) Date of Patent: Jun. 20, 2017

(54) WIRELESS POWER SYSTEM WITH POSITION DETECTION

(71) Applicant: AbdurRahman Bhatti, Clyde Hill, WA (US)

(72) Inventor: AbdurRahman Bhatti, Clyde Hill, WA (US)

( * ) Notice: Subject to any disclaimer, the term of this patent is extended or adjusted under 35 U.S.C. 154(b) by 0 days.

(21) Appl. No.: 15/291,346

(22) Filed: Oct. 12, 2016

(51) Int. Cl.
*H02J 5/00* (2016.01)
*H02J 50/90* (2016.01)
*H02J 50/40* (2016.01)
*H02J 50/12* (2016.01)

(52) U.S. Cl.
CPC .............. *H02J 50/90* (2016.02); *H02J 50/12* (2016.02); *H02J 50/40* (2016.02)

(58) Field of Classification Search
CPC ............. H02J 50/12; H02J 50/90; H02J 50/05
See application file for complete search history.

(56) References Cited

U.S. PATENT DOCUMENTS

| | | | | |
|---|---|---|---|---|
| 6,967,462 B1 * | 11/2005 | Landis | ................... | H02J 17/00 320/101 |
| 7,786,419 B2 * | 8/2010 | Hyde | ................... | H02J 17/00 250/201.1 |
| 2006/0238365 A1 * | 10/2006 | Vecchione | ............. | G04C 10/00 340/657 |
| 2009/0284218 A1 * | 11/2009 | Mohammadian | .... | G06K 7/0008 320/107 |

OTHER PUBLICATIONS

"Strapped Magnetron Performance Affected by Dielectric Material Filling", Vyas et al., IEEE Transactions on Plasma Science, vol. 43, No. 9, Sep. 2015.*

* cited by examiner

*Primary Examiner* — Jared Fureman
*Assistant Examiner* — Joel Barnett
(74) *Attorney, Agent, or Firm* — Wolf, Greenfield & Sacks, P.C.

(57) ABSTRACT

A wireless power transfer system with integrated positioning system. The wireless power transfer system includes a power receiver and a power transmitter comprising a magnetron, a dielectric material associated with the magnetron, in an amount positioned such that an output frequency of the magnetron is less than a threshold value, and a directive element configured to focus the radiation into an electron beam. The positioning system includes a locator receiver coupled to the radiating power transmitter and a locator transmitter coupled to the power receiver, wherein the locator receiver is configured to wirelessly determine a location of the locator transmitter relative to a location of the locator receiver without using triangulation, in at least two orientations of the locator receiver relative to the locator transmitter in which the locator transmitter has moved relative to the locator receiver in three axes.

10 Claims, 12 Drawing Sheets

$$n, j, k \in 1, 2, 3$$

$$m_{jk} = \frac{c_0}{d^2} \cos(V_{T_0}) \cos(V_{R_0})$$

$$d = \sqrt{x_0^2 + y_0^2 + z_0^2}$$

$$d \cdot \tan(V_{R_1}) = z_0, \ d \cdot \tan(V_{R_2}) = x_0, \ d \cdot \tan(V_{R_3}) = y_0$$

$$m_{n_0} = \frac{c_0}{d^2} \cos(V_{T_0}) \cos(V_{x_0})$$

$$m_{p_0} = \frac{c_0}{d^2} \cos(V_{T_0}) \cos(V_{y_0})$$

$$|x_0| = |d \cdot \cos(U_{x_0}) \cdot (1 + \sec(V_{x_0}))|$$

$$y_0 = \left(\frac{d\sqrt{2}}{2}\right) \cdot (\sin(U_{x_0}) \cdot (1 + \sec(V_{x_0})) - \tan(V_{x_0}))$$

$$z_0 = \left|\left(\frac{d\sqrt{2}}{2}\right) \cdot (\sin(U_{x_0}) \cdot (1 + \sec(V_{x_0})) + \tan(V_{x_0}))\right|$$

$$x_0 = \left(\frac{d\sqrt{2}}{2}\right) \cdot (\tan(V_{y_0}) + \cos(U_{y_0}) \cdot (1 + \sec(V_{y_0})))$$

$$|y_0| = |d \cdot \sin(U_{y_0}) \cdot (1 + \sec(V_{y_0}))|$$

$$z_0 = \left|\left(\frac{d\sqrt{2}}{2}\right) \cdot (\tan(V_{y_0}) - \cos(U_{y_0}) \cdot (1 + \sec(V_{y_0})))\right|$$

$$c_0 = \frac{E_R B_T B_R l}{4\pi}$$

$$-\frac{\pi}{2} \leq V_{T_0}, V_{R_0}, V_{x_0}, V_{y_0} \leq \frac{\pi}{2}$$

FIG. 19

WIRELESS POWER SYSTEM WITH POSITION DETECTION

Wireless power systems transmit electrical energy from a power source to an electrical load without the use of discrete human-made conductors (e.g., wires). Wireless power systems can be broadly categorized into two types. Non-radiative (near-field) wireless power transfer techniques use inductive coupling between coils of wire to transfer power across small distances using magnetic fields. Radiative (far-field) wireless power transfer techniques transfer power over larger distances via beams of electromagnetic radiation. In radiative wireless power transfer systems a transmitter generates a beam of electromagnetic radiation that is focused at a location of a receiver that converts the received beam of electromagnetic radiation into an electrical signal.

SUMMARY

Some embodiments are directed to a wireless power system. The wireless power system comprises a wireless power transfer system comprising a radiating power transmitter configured to output electromagnetic radiation. The radiating power transmitter includes a magnetron, an auxiliary dielectric material associated with the magnetron, in an amount positioned such that an output frequency of the magnetron is less than a threshold value, and a directive element configured to focus the electromagnetic radiation into an electron beam in a particular direction. The wireless power transfer system further comprises a power receiver configured to receive the electron beam output from the radiating power transmitter when incident on the power receiver. The wireless power system further comprises a positioning system configured to orient the radiating power transmitter relative to the power receiver to enable the power receiver to receive at least a portion of the electron beam output from the radiating power transmitter. The positioning system comprises a locator receiver coupled to the radiating power transmitter and a locator transmitter coupled to the power receiver, wherein the locator receiver is configured to wirelessly determine a location of the locator transmitter relative to a location of the locator receiver without using triangulation, in at least two orientations of the locator receiver relative to the locator transmitter in which the locator transmitter has moved relative to the locator receiver in three axes.

Other embodiments are directed to a positioning system for a wireless power system. The positioning system comprises a first unit and a second unit, wherein the first unit is configured to wirelessly determine a location of the second unit relative to the first unit without using triangulation, in at least two orientations of the first unit relative to the first unit in which the second unit has moved relative to the first unit in three axes.

Other embodiments are directed to a wireless power system comprising a radiative power system integrated with a radiative wireless power transfer system, wherein the positioning system comprises a locator receiver coupled to a wireless power transmitter of the radiative wireless power transfer system and a locator transmitter coupled to a wireless power receiver of the radiative wireless power transfer system, wherein the locator receiver is configured wirelessly determine a location of the wireless power transmitter relative to the first unit without using triangulation.

Other embodiments are directed to a radiative wireless power transfer system. The radiative wireless power system comprises a magnetron including a dielectric material arranged within the magnetron such that an output frequency of the magnetron is less than a threshold value. In one aspect, the radiative wireless power system further comprises a reservoir capacitor associated with the magnetron such that the output frequency bandwidth is less than 15 MHz. In another aspect, the radiative wireless power system further comprises a circuit configured to vary the output power of the magnetron.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

FIG. 19 shows a system of equations for determining a location of a locator transmitter without the use of triangulation in accordance with some embodiments.

DETAILED DESCRIPTION

Figure 1:
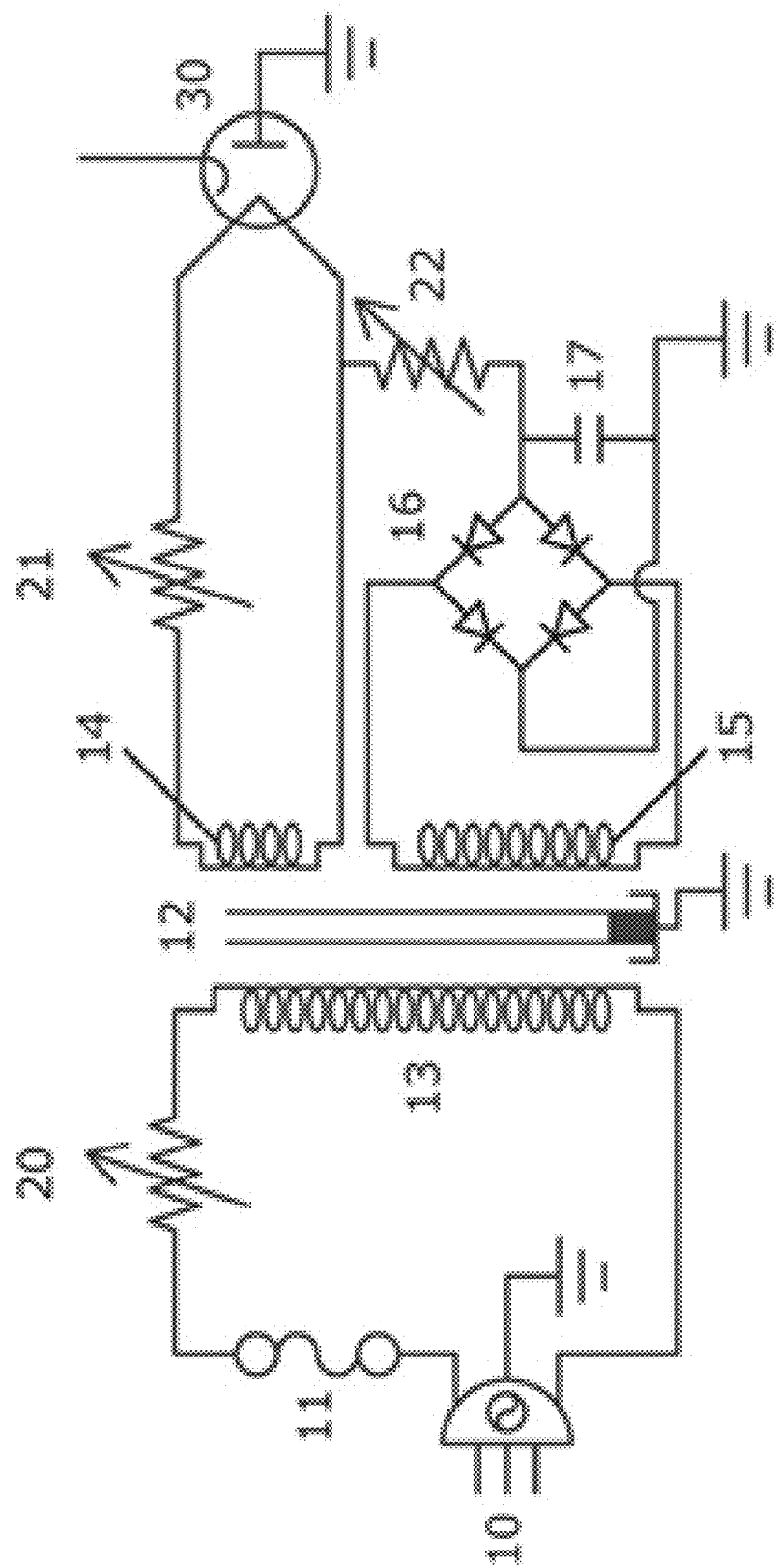
FIG. 1 shows magnetron transmitter circuitry in accordance with some embodiments.

One of the challenges with radiative wireless power systems is that the beam of electromagnetic radiation generated by the transmitter must be accurately directed to a particular receiver location. Additionally, the characteristics of the electromagnetic radiation transferred between the transmitter and the receiver should be such that the transmission is safe for humans in environments in which the wireless power system is used. The inventor has appreciated and recognized that conventional radiative wireless power systems may be improved by integrating a position detection system that operates without the use of triangulation with a wireless power transfer system, and by modifying aspects of the wireless power transmitter to ensure that the characteristics of the transmitted electromagnetic radiation are safe for use in various environments.

As used herein, the term triangulation means a method of determining position of a target object by measurement of an interaction between the target object and each of two reference objects which are at known positions relative to the target object.

As used herein, the term wireless power transfer means the transmission of electrical energy from a first unit to a second unit without the use of discrete human made connectors. In some embodiments, the first unit is a power source and the second unit is an electrical load.

As used herein, the term RF power amplifier means an electronic amplifier that increases the power of a radio-frequency signal.

As used herein, the term antenna means an electrical device configured to convert electric power into electromagnetic radiation (EMR), and vice versa.

As used herein, the term radio frequency tuner means a subsystem that receives radio frequency transmission and converts the selected carrier frequency and its associated bandwidth into a fixed frequency that is suitable for further processing.

As used herein, the term processor means a unit of electronic circuitry that carries out the instructions of a program by performing the arithmetic, logical, control and input/output operations specified by the instructions.

As used herein, the term orienting device means a device configured to control the direction in which directive radiation travels.

As used herein, the term oscillating circuit means an electronic circuit that produces a periodic, oscillating signal.

As used herein, the term directive element means a device that converts radiation into a beam or orients radiation in a particular direction.

As used herein, the term radio telescope means an antenna in which the feed antenna is mounted at or behind the surface of a concave main reflector, and is aimed at a smaller convex secondary reflector suspended in front of the primary reflector.

As used herein, the term reservoir capacitor means a capacitor that is used to smooth the pulsating direct current from an alternating current rectifier.

As used herein, the term electromagnetic radiation (EMR) means the radiant energy released by electromagnetic processes.

As used herein, the term rectenna means an antenna that is used to convert electromagnetic energy into direct current.

Some embodiments are directed to a wireless power transfer system that includes a power transmitter. FIG. 1 illustrates circuitry for a magnetron power transmitter in accordance with some embodiments. As shown, the power transmitter is configured to operate using 120 VAC power source 10. At any point in time, the current flowing through the circuit may vary. In order to prevent the circuit from shorting or burning out due to a design error or power influx, the circuitry includes fuse 11, which regulates the maximum amount of current in the system.

Inductor coils 13 and 14 combined with the ferrite core of transformer 12 function as a step-down transformer. Inductor coils 13 and 15 combined with ferrite core of transformer 12 function as a step-up transformer. In a step-up or step-down transformer, the following relation holds:

(# of primary windings)/(# of secondary windings)=
(Primary Voltage)/(Secondary Voltage)=
(Primary Current)/(Secondary Current).

Following from this relation, in some embodiments, the number of windings on coils 13 and 14 are such that the step-down transformer provides the necessary high current to the cathode in magnetron 30. Similarly, the windings on coils 13 and 15 allow the step-up transformer, along with bridge rectifier 16, to create the necessary voltage difference between the anode and the cathode in magnetron 30, which allows electrons emitted from the negatively-charged cathode of the magnetron to accelerate towards the positively charged anode of the magnetron.

Magnetron 30 comprises a high-powered vacuum tube configured to generate electromagnetic waves across a relatively wide frequency spectrum by using the interaction of a stream of electrons with a magnetic field while moving past a series of cavity resonators.

In the center of the magnetron, a cathode filament is used to heat an emissive material (commonly barium oxide). The entire system is supported by a ceramic insulator and sealed into the center of an anode. The anode, a hollow copper cylinder lined with resonant cavities, encapsulates the cathode structure. The anode is surrounded by a set of cooling fins, and is mounted parallel to two permanent magnets.

Figure 2:
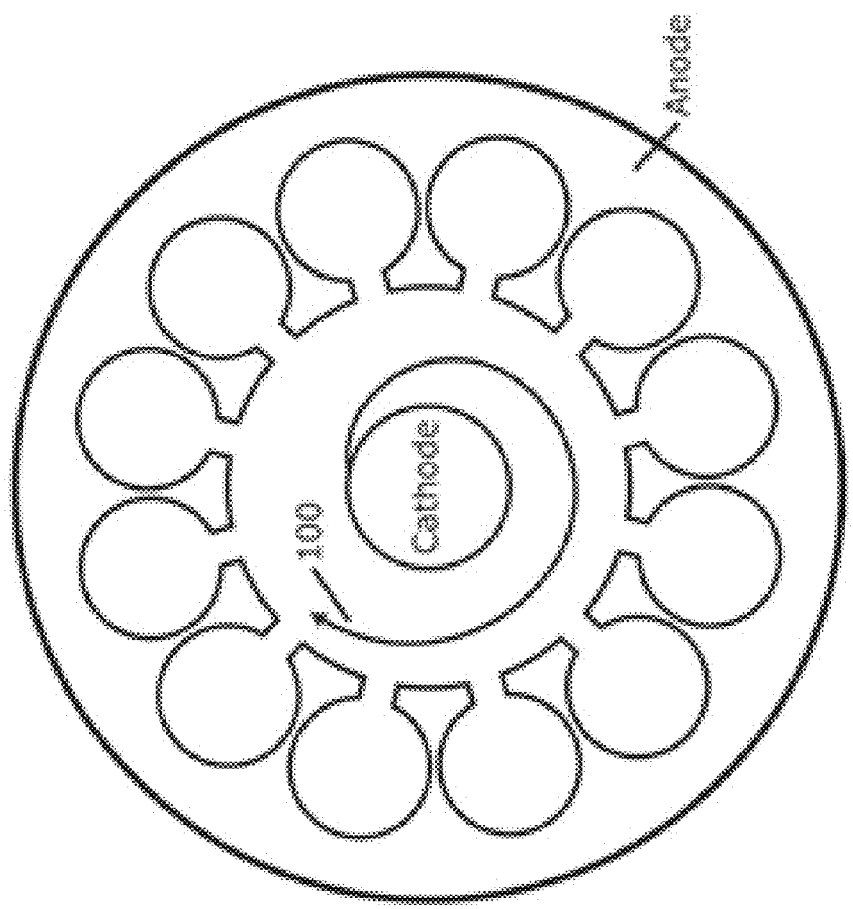
FIG. 2 shows an electron path through a magnetron in accordance with some embodiments.

The magnetron operates using thermionic emission, which is the thermally induced flow of charge carriers from a surface. In this case, thermionic emission within a magnetron refers to electrons being emitted from a hot cathode, which is heated by a filament with a current passing through it. The electron path inside of a magnetron is illustrated in FIG. 2.

The Lorentz force is the combination of the electric and magnetic forces on a point charge due to electromagnetic fields. If a particle is in the presence of an electric field E and a magnetic field B, then the Lorentz force is given by: $qE+qv \times B$, where q is the charge of the particle, and v is the particle velocity. The difference in charge between the cathode and the anode of the magnetron creates an electric field. Two permanent magnets that are mounted parallel to the anode create a magnetic field perpendicular to the electric field. Thus, in the context of a magnetron, the Coulomb force and the Lorentz force act in the same plane.

Thermionic emission causes electrons to be emitted from the heated cathode. These electrons accelerate towards the anode provided a large enough difference in voltage exists between the cathode and anode. For instance, as shown in FIG. 2, if the cathode is negatively charged, and the anode is connected to ground giving it a relative positive charge, the electrons being negatively charged will naturally accelerate towards the anode.

However, the Lorentz force acting on each individual electron due to the presence of the generated electric and magnetic fields affects the electron path though the magnetron. Instead of travelling radially outward from the cathode in the center of the magnetron towards the anode, as shown in FIG. 2, an arbitrary electron 100 will follow a curved path instead. This ultimately creates a stream of electrons flowing past each of the cavity resonators.

The flow of electrons past the cavity resonators generates microwave oscillations in the resonant cavities at the resonant frequency of the cavities. An antenna may "tap" one of these cavities and extend outside the magnetron to emit microwave radiation.

Magnetron 30 in accordance with some embodiments is configured to transfer power in the form of electromagnetic radiation (EMR) wirelessly to a receiver without posing a danger to humans, and preferably without a high level of EMR absorption between the magnetron and the receiver. Because the human body absorbs little or no energy from radio waves with low frequencies, in some embodiments the output frequency of magnetron 30 is less than a threshold value (e.g., within the radio frequency range or within the microwave frequency range). In some embodiments, the threshold value is 300 MHz. In other embodiments, the threshold value is 2.5 GHz, 440 MHz, 148 MHz, or 108 MHz.

The output frequency of a magnetron is equivalent to the resonant frequency of the resonant cavities and the resonant frequency of a resonant cavity decreases as the cavity volume increases. Accordingly, an output frequency of the magnetron less than the threshold value may be achieved by increasing the volume of the resonant cavities, but for this to happen, the magnetron would have to be many times larger than a typical microwave oven magnetron, which operates at 2460 MHz.

Figure 3:
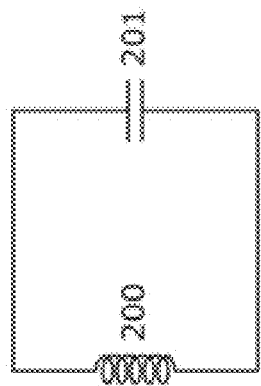
FIG. 3 shows a simple LC circuit.

The inventor has recognized that magnetron resonant cavities may be analogized to LC circuits, an example of which is illustrated in FIG. 3. An LC circuit is a circuit including an inductor 200 and a capacitor 201 connected together. During its operation, the charged capacitor stores energy in an electric field between the two plates of the capacitor. As the capacitor is discharged, current flows through the inductor and energy is stored in the magnetic field of the inductor. After the electric field of the capacitor is completely dissipated, the capacitor recharges with a reversed polarity. In this way, the LC circuit oscillates energy back and forth between the capacitor and the inductor.

The resonant frequency of an LC circuit is $1/2\pi\sqrt{(LC)}$ where L is the inductance of the inductor and C is the capacitance of the capacitor. Accordingly, the LC circuit in FIG. 3, if left in isolation, will oscillate energy between inductor 200 and capacitor 201 at a specific resonant frequency determined by the inductance and capacitance of two components, respectively.

Figure 4:
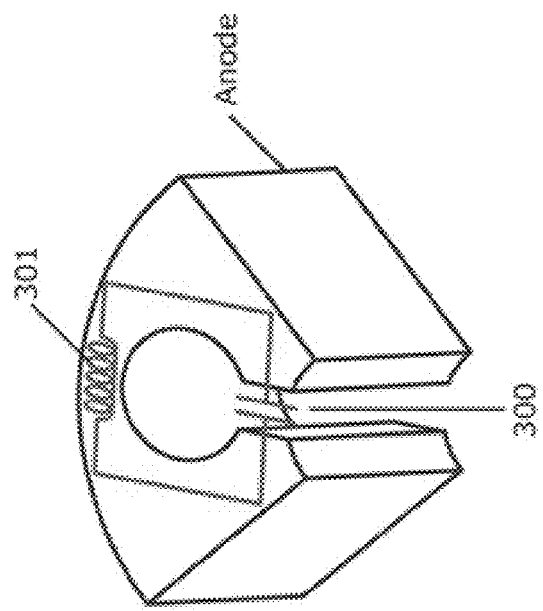
FIG. 4 shows how a hole and slot resonant cavity operates as an LC circuit in accordance with some embodiments.

In the case of a slot and hole resonant cavity, an example of which is shown in FIG. 4, the two plates that make up the slot may be considered as the two plates of a capacitor 300 and the wall of the cylindrical resonant cavity may be considered as an inductor coil 301. The resonant frequency of a cylindrical cavity with a constant volume is proportional to $1/2\pi\sqrt{(\mu\in)}$ where $\mu$ is the permeability ("inductance per meter") of the resonant cavity and $\in$ is the permittivity ("capacitance per square meter") of the cavity interior.

The inventor has recognized that the resonant frequency of a resonant cavity of magnetron 30 may be tuned by arranging a dielectric material within the slot of a hole and slot resonator with the cavity. A dielectric material is an electrical insulator that can be polarized by an applied electric field. Dielectric materials placed between plates in capacitors increase capacitance of the capacitor. The dielectric constant of a material is the permittivity of the material relative to a vacuum, or rather a material with a dielectric constant of n has a permittivity that is n times that of a vacuum.

Because the capacitance of a capacitor is proportional to the permittivity of the material between its plates, arranging a dielectric material in the slot of a resonant cavity increases the capacitance of capacitor 300, thereby lowering the resonant frequency of the representative LC circuit and increasing the permittivity of the cavity interior.

Figure 5:
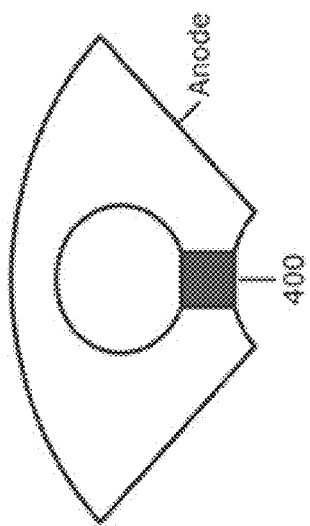
FIG. 5 shows a cavity of a resonant cavity of a magnetron filled with a dielectric material in accordance with some embodiments.

FIG. 5 illustrates a resonant cavity of magnetron 30 filled with a dielectric material 400 to decrease its resonant frequency. Adding dielectric material 400 to the cavity increases the permittivity of the cavity interior, allowing for a decrease in the resonant frequency of the cavity without increasing the overall volume. Using this technique, a magnetron with both a relatively small volume and a low resonant frequency may be constructed in accordance with some embodiments. In some embodiments, dielectric material 400 has a dielectric constant greater than 1.0006. In other embodiments, dielectric material 400 has a dielectric constant greater than 2. In yet other embodiments, dielectric material 400 has a dielectric constant greater than 5.

A magnetron is an imperfect system in that there tends to be a substantial bandwidth of output frequencies. Although the central frequency may be aligned with the resonant frequency of the cavities, the bandwidth of the output spectrum may range from 20 MHz to as large as 100 MHz in some conventional magnetrons (e.g., used in some microwave ovens). The large bandwidth of output frequencies is due, at least in part, to "ripple content" in the magnetron power supply. In particular, as the ripple factor of the DC rectification in the power supply increases, the output frequency bandwidth also increases.

Figure 6:
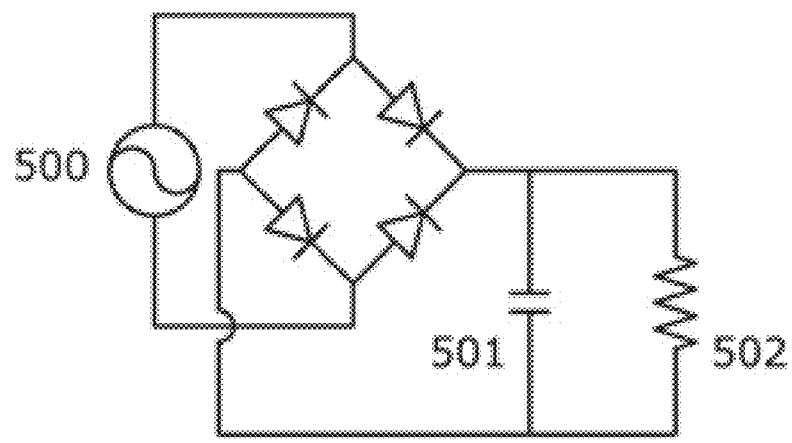
FIG. 6 shows rectification circuitry included in magnetron transmitter circuitry in accordance with some embodiments.

FIG. 6 shows a rectification circuit in accordance with some embodiments. Assuming a sawtooth waveform, the ripple factor from a full wave rectifier as shown in FIG. 6 is equal to $1/4\sqrt{3}fCR$, where f is the AC frequency of power source 500, C is the capacitance of capacitor 501, and R is the resistance of resistor 502 (load resistance).

The inventor has recognized that if the ripple factor from the rectifier is lower than about 5%, the output bandwidth of the magnetron output frequency will be 10 MHz or less. Load resistance is determined as the rectified voltage divided by the current passing through the load. Based on previous experiments, the maximum current passing through a load will be such that if capacitor 17 in the transmitter circuit of FIG. 1 has a capacitance of more than 10 µF, the ripple factor should be less than 5%, and thus the broadband spectrum of the output frequencies is narrowed substantially.

In some embodiments, power that flows to the magnetron is reduced in a predictable way by increasing the resistance of variable resistor 20 shown in the transmitter of FIG. 1. If the voltage drop across this resistor is too large, the voltage difference between the anode and the cathode of the magnetron may not be large enough for microwave emission to occur. Accordingly, in some embodiments, the power provided to the magnetron is varied by adjusting the resistance of variable resistor 21.

In an ideal step-up or step-down transformer the following relation holds:

(Secondary Current)=(Source Voltage)/((a/(Secondary Resistance))+(a*(Primary Resistance))), where a=(# of primary windings)/(# of secondary windings).

The Joule-Lenz law states that the amount of heat emitted from a conductor with an electric current passing through it in a fixed amount of time is proportional to: (amount of current passing through conductor)$^2$*(resistance of conductor). The Richardson-Dushman Equation provides that in the context of thermionic emission, $J=A \cdot T^2 \cdot e^{(-W/kT)}$, where J is the emitted current density, T is the temperature of the emissive material, A is Richardson's Constant, W is the work function of the emissive material, and k is the Boltzmann constant.

In the context of the step-down transformer component of transformer 12 in the transmitter of FIG. 1, the resistance of variable resistor 20 represents the full resistance of the primary circuit (including the resistance of the wire, inductance coil 13, etc.). When the resistance of the primary circuit is both known and fixed, the secondary resistance of the transformer circuit is given by the sum of the resistance of the variable resistor 21 and the resistance of the cathode because variable resistor 21 and the cathode filament are in series assuming that the cathode resistance is both known and fixed.

In a series circuit, the current flowing through the circuit has the same value everywhere. Accordingly, the current flowing through the cathode can be determined if the resistance of variable resistor 21 and the ratio of turns of the inductor coil 13 to turns of the inductor coil 14 are known.

In this context, heat emitted for a given resistance of variable resistor 21 is assumed to be constant. Therefore, after a sufficient amount of time, the temperature of the conductor is determined based on the Joule-Lenz law, described above. In this context, the "conductor" is the cathode filament, which is used to heat an emissive material.

The relationship between heat and temperature in this context may be derived assuming the proportionality constant of the relationship given by the Richardson-Dushman equation and the work function of the emissive material. The current density of the electrons emitted from the cathode emissive material may then be determined and varied by changing the resistance of variable resistor 21.

In the context of thermionic emission, emitted current density is proportional to anode current. Furthermore, the output power of magnetron 30, assuming a constant anode voltage, is approximately proportional to the average anode current. Based on these observations, the emitted current density from the cathode can be controlled by varying the resistance of variable resistor 21, thereby controlling the output power of the magnetron.

Figure 7:
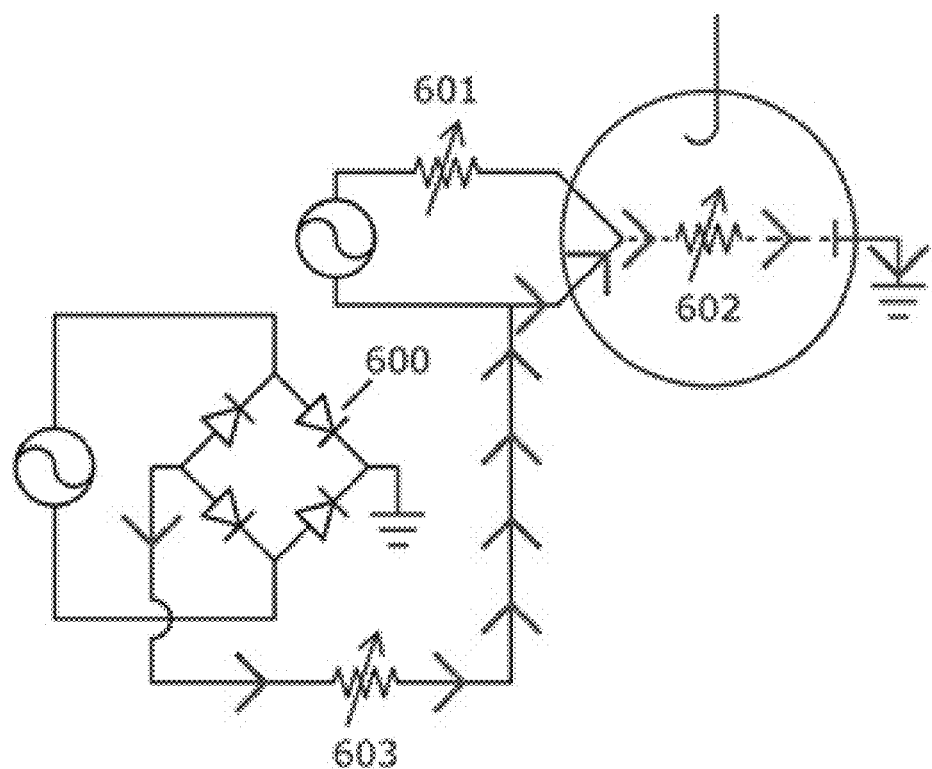
FIG. 7 shows alternate magnetron circuitry in accordance with some embodiments.

FIG. 7 shows an alternate magnetron circuit representation in accordance with some embodiments in which the space between the cathode and the anode in the magnetron is considered as a variable resistor 601 arranged between two "halves" of a bridge rectifier 600, with current flowing through variable resistor 601 and into the anode of the magnetron. The resistance of "variable resistor" 602 may be determined by the current passing through the cathode filament, and therefore can be altered by changing the resistance of variable resistor 601, which is analogous to variable resistor 21 in FIG. 1.

It follows that the output power of the magnetron can be altered by changing the resistance of either variable resistor 602 or 603 in the circuitry of FIG. 7, since both resistors restrict the amount of current flowing to the anode. Thus, another technique for controlling output power of the magnetron in accordance with some embodiments is by changing the resistance of variable resistor 22, instead of, or in addition to altering the amount of current delivered to the cathode by changing the resistance of variable resistor 21.

Magnetron 30 generates a point source of electromagnetic radiation. A point source of electromagnetic radiation effectively creates an environment in which photons are radiated out from the source in all directions. The inventor has recognized that using a point source of electromagnetic radiation in a wireless transfer system has limited utility over long distances when the electromagnetic radiation is not focused. Accordingly, some embodiments are directed to using a directional element to focus the output of the magnetron into an electron beam directed in a particular direction (e.g., the direction of a power receiver). A non-limiting example of a directional element that may be used in accordance with some embodiments is an elliptical radio telescope.

Figure 8:
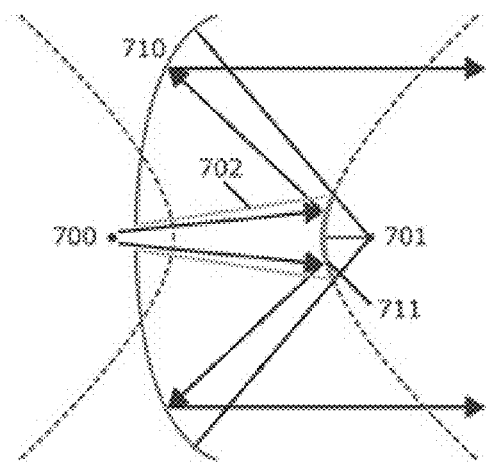
FIG. 8 shows a Cassegrain antenna design.

FIG. 8 shows a conventional Cassegrain antenna design for focusing a point source of electromagnetic radiation into an electron beam. As shown, a diverging electron beam 702 with a point source at location 700 radiates from an aperture in parabolic reflector 710, and reflects off hyperbolic reflector 711. The hyperbola reflective property states that if a ray emanates from one focus of a hyperbola and is reflected from either branch of the hyperbola, the ray will appear to have come from the other focus. By this proposition, and because reflectors 710 and 711 share a focus at point 701, photons from beam 702 are reflected off reflector 711 at the same angle that the photons would have travelled if they had been directly emanated from point 701. The parabola reflective property states that a ray that emanates from the focus of a vertical parabola will reflect off the parabola such that the new path of the ray is parallel to the y-axis. Accordingly, because point 701 is the focus of parabolic reflector 710, all photons that bounce off reflectors 711 and 710 travel parallel to each other in a "collimated" form.

The directional element in accordance with some embodiments is configured to facilitate efficient transmission of wireless power over longer distances. To increase power intensity, which in this context is proportional to density of photons per unit of area, some embodiments focus the generated electron beam towards a single point in space at the location of the wireless power receiver.

Figure 9:
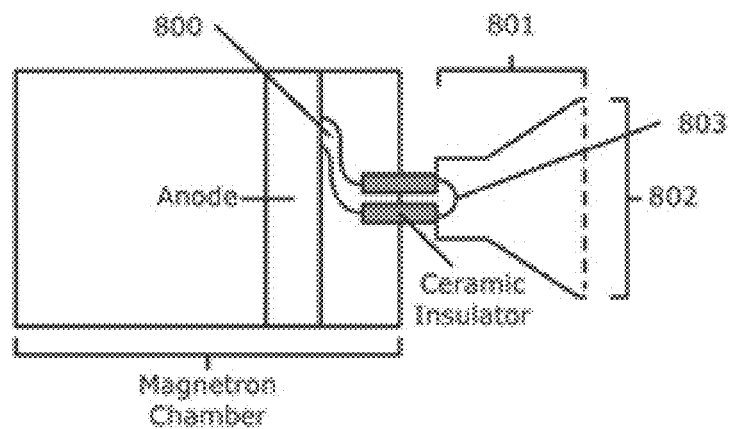
FIG. 9 shows a magnetron output antenna design in accordance with some embodiments.
Figure 10:
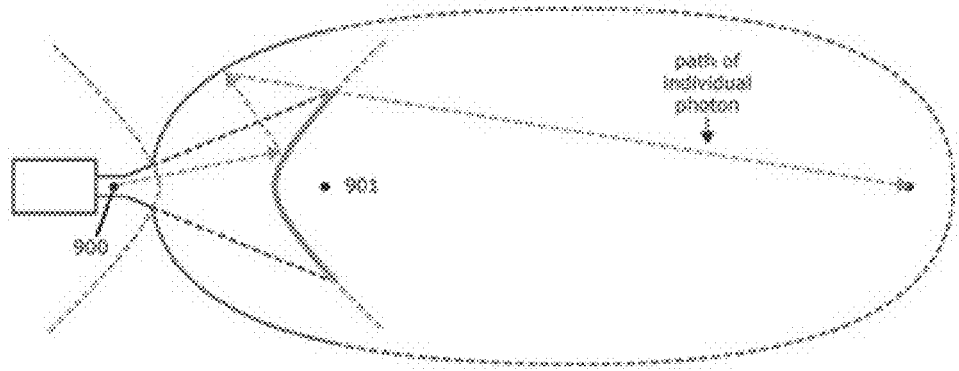
FIG. 10 shows an elliptical radio telescope transmitter that may be used as part of the magnetron output antenna design of FIG. 9.

FIG. 9 shows the design of a magnetron output antenna design that employs an elliptical radio telescope transmitter as a directional element in accordance with some embodiments. In this design, the photons generated by the magnetron emanate off copper hemisphere 803 and reflect off conical horn antenna 801 formed around copper hemisphere 803. The elliptical radio telescope operates under the same principle as the Cassegrain antenna described in connection with FIG. 8, but includes an elliptical reflector instead of a parabolic reflector, with the two reflectors sharing near focus 901 as illustrated in FIG. 10. The reflective properties of an elliptical reflector are such that when a ray emanates from one of the foci of the ellipse and meets a point on the ellipse, the ray reflects off of the tangent to the ellipse at the point of contact, and passes through the other focus.

Assuming that the set of reflectors is sufficiently small such that the electron beam emerging from horn antenna 801 has an approximate spherical wavefront upon reaching the hyperbolic reflector that has an implied source at point 900, emerging photons will reflect off the elliptical reflector and be directed at the far focus. Assuming an accurate design, power intensity increases as a wireless power receiver is located closer to the far focus.

In some embodiments, a power receiver configured to receive electromagnetic radiation generated by a radiating transmitter includes a receiving antenna, an impedance matching network and a rectifier. A receiving antenna is an electrical device that converts electromagnetic radiation to electrical power. Some embodiments include a broadband antenna as the receiving antenna to enable the antenna to receive power across a wide spectrum of frequencies. In some embodiments, the receiving antenna is a log periodic dipole antenna, which receives power across a broadband spectrum while also maintaining a relatively high level of efficiency.

Figure 11:
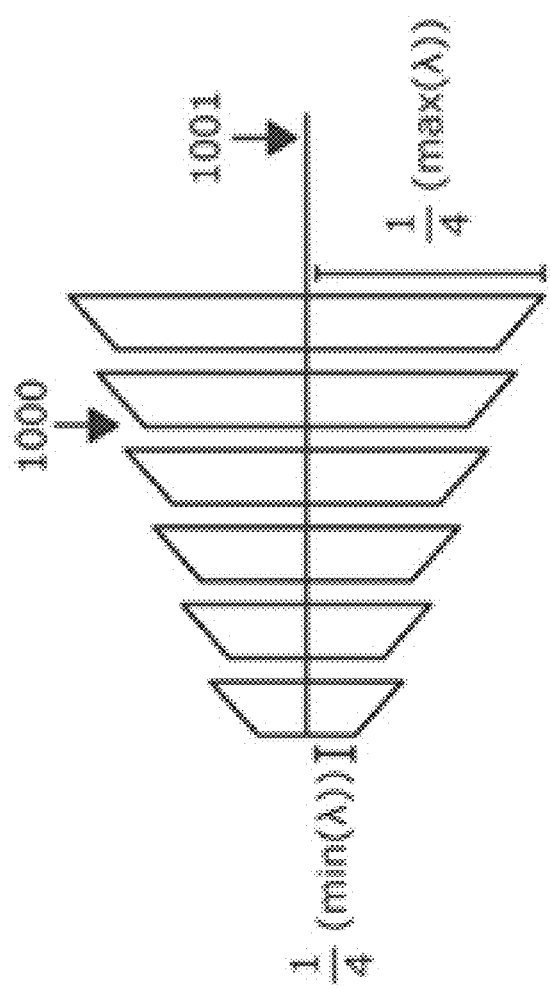
FIG. 11 shows a log periodic dipole antenna that maybe used in a power receiver in accordance with some embodiments.

FIG. 11 illustrates a log periodic dipole antenna that may be used as a receiving antenna of a power receiver in accordance with some embodiments.

As shown, a log periodic dipole antenna consists of dipoles, in this case half wave dipoles, known as "elements" positioned along support boom 1001 arranged across the antenna axis. In FIG. 11, the elements are shown as copper sheets 1000.

The lengths of the elements correspond to different frequencies that are the most efficiently received by that element. Provided that the smallest and largest lengths of the copper sheets correspond to the upper and lower bounds of transmitted EMR frequency, a log periodic dipole antenna is configured to receive and convert power into electrical power efficiently.

As discussed above, a power receiver in accordance with some embodiments includes an impedance matching network coupled to the receiving antenna. Impedance matching is the practice of designing the input impedance of an electrical load to maximize power transfer or minimize signal reflection from the load. Impedance matching and configuration of the impedance circuit depends on the received signal and type of antenna used. For instance, if the receiving antenna used is a half wave dipole antenna, the source impedance is 73+42.5 j ohms, and the load achieves a maximum power transfer when the load impedance is 73−42.5 j ohms.

As discussed above, a power receiver in accordance with some embodiments includes a rectifier coupled to the impedance matching network. A rectifier is a device that converts alternating current, the type of current the receiving antenna converts EMR power into, into direct current, which can be used to power an electrical load device.

Some embodiments include a rectenna as a wireless power receiver. A "rectenna" by definition is the combination of a rectifier and an antenna. Thus, a rectenna EMR power receiver converts received EMR into usable direct current.

As discussed above, one of the driving principles behind being able to provide efficient power transfer across long distances using a wireless power transfer system designed in accordance with some embodiments is to ensure that the electron beam output from the transmitter is directed to the location in space of a power receiver configured to receive the transmitted EMR. Accordingly, some embodiments include a positioning system configured to orient the radiating power transmitter relative to the power receiver to enable the power receiver to receive at least a portion of the electron beam output from the radiating power transmitter.

Figure 12:
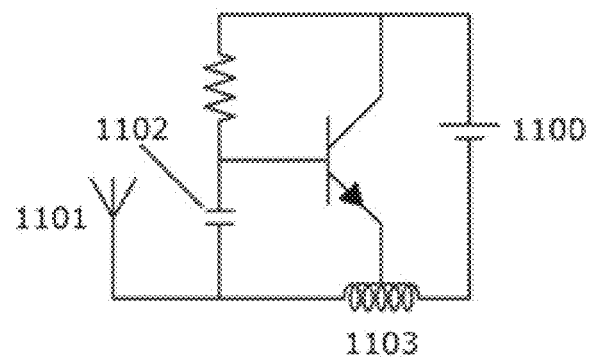
FIG. 12 shows a transmitter circuit for a locator transmitter in accordance with some embodiments.
Figure 13:
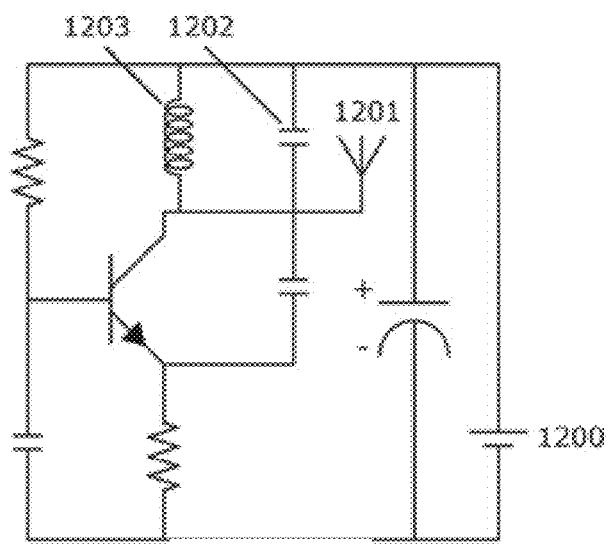
FIG. 13 shows an alternate transmitter circuit for a locator transmitter in accordance with some embodiments.

In some embodiments, the positioning system includes a locator transmitter operatively connected to a power receiver. The locator transmitter may include an oscillating circuit and at least one antenna. FIG. 12 shows a transmitter circuitry that may be included in a locator transmitter in accordance with some embodiments. FIG. 13 shows alternate transmitter circuitry that may be included in a locator transmitter in accordance with some embodiments.

As shown in both FIGS. 12 and 13, the transmitter circuitry includes an oscillator circuit coupled to antennae 1101 and 1201. In both circuits, the output frequencies of the transmitters are determined by LC circuits, and therefore the frequencies of the circuits are determined by the capacitances of capacitors 1102 and 1202 and the inductances of induction coils 1103 and 1203. The output power of the transmitter is determined by the voltage and capacity of power sources 1100 and 1200.

Figure 14:
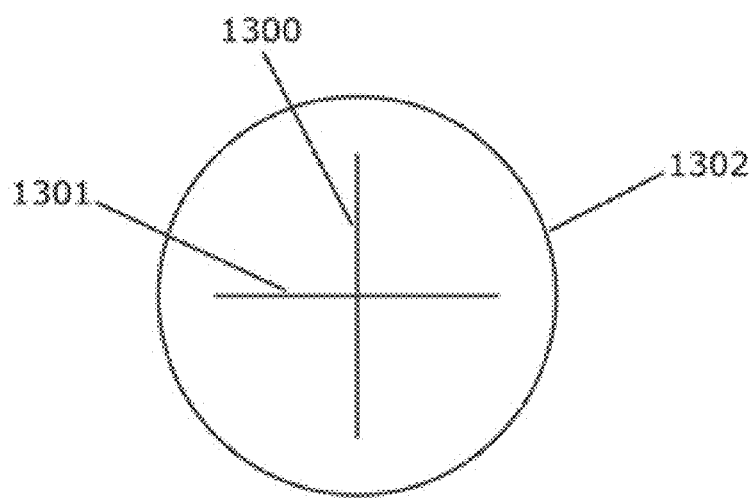
FIG. 14 shows a transmitter antennae arrangement for a locator transmitter in accordance with some embodiments.

FIG. 14 shows that the locator transmitter may include a plurality of antennae, each of which is configured to broadcast on a distinct frequency, requiring each antenna to have its own independent oscillator circuit. In the example shown in FIG. 14, the three antennae are the two short dipole antennae 1300 and 1301 mounted perpendicular to each other and small loop antenna 1302 mounted in the same plane as the dipole antennae.

Figure 15:
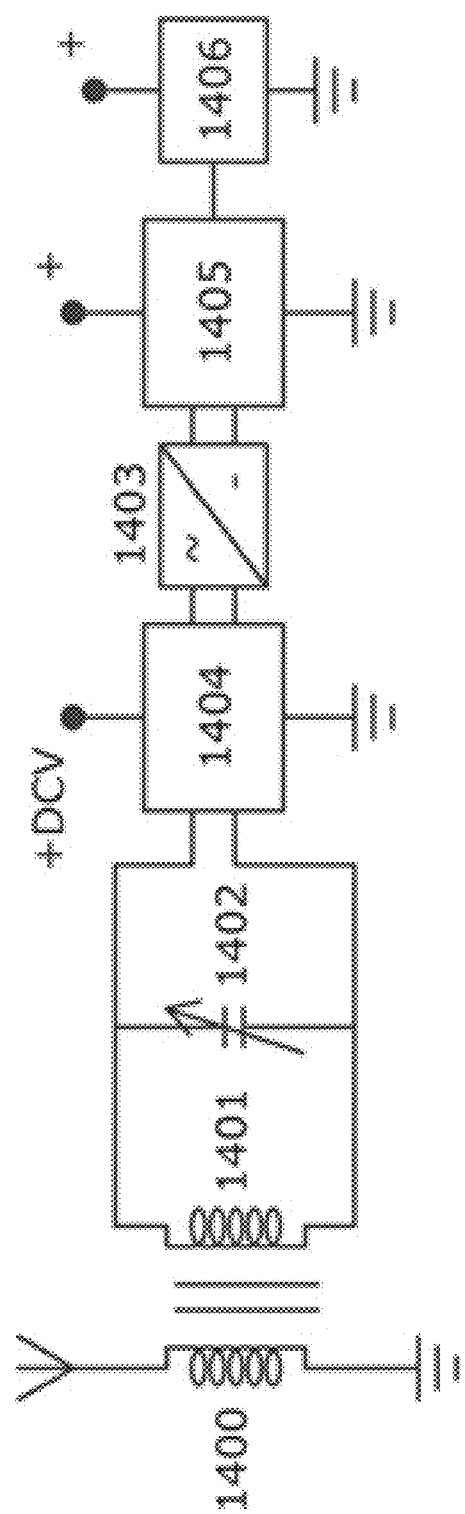
FIG. 15 shows a receiver circuit for a locator receiver in accordance with some embodiments.
Figure 17:
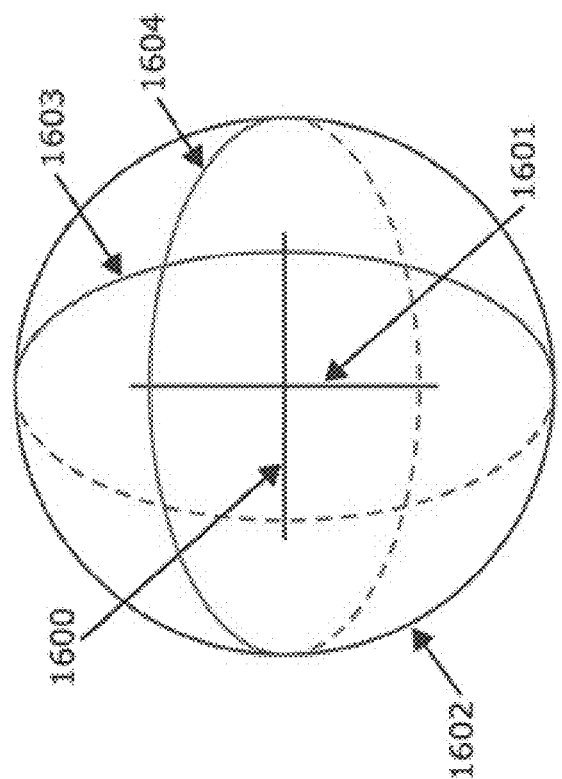
FIG. 17 shows a receiver antennae arrangement for a locator receiver in accordance with some embodiments.
Figure 16:
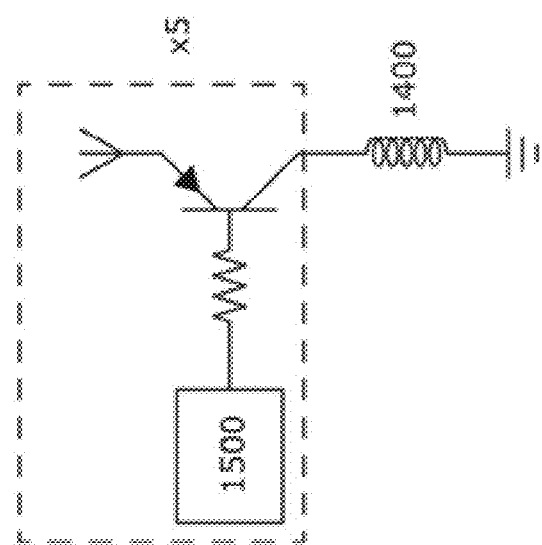
FIG. 16 shows antennae transistor switches for use in a locator receiver in accordance with some embodiments.

In some embodiments, the positioning system includes a locator receiver operatively connected to a radiating power transmitter. In some embodiments, the locator receiver may contain a plurality of antennae, a variable tuner, an RF power amplifier, a processor, and an orienting device. FIG. 15 shows receiver circuitry that may be included in a locator receiver in accordance with some embodiments. FIG. 16 shows antennae transistor switches that may be used in a locator receiver in accordance with some embodiments. FIG. 17 schematically illustrates the position of a plurality of receiver antennae in a locator receiver in accordance with some embodiments.

As shown in FIG. 17, the locator receiver includes five receiving antennae. Short dipole antennae 1600 and 1601 and small loop antenna 1602 are configured in the same arrangement as discussed above for the transmitter antennae in FIG. 14. Small loop antennae 1603 and 1604 have axes of rotation that create 45 degree angles with the axis of rotation of small loop antenna 1602.

The antenna configuration shown in FIG. 17 coupled with the receiver circuitry illustrates in FIGS. 15 and 16 allow the locator receiver to determine the location of the locator transmitter relative to the locator receiver in three dimensions.

As shown in FIG. 15, inductor coils 1400 and 1401 and programmable variable capacitor 1402 form a tuning circuit configured to filter signals passing through the tuning circuit from each antenna expect for a single frequency which can be determined and fixed by altering the capacitance of capacitor 1402. The filtered signal is amplified by RF power amplifier 1404 and then converted from alternating to direct current by bridge rectifier 1403. Based on the received signal strength, processor 1405 is configured to register a higher or lower value, and use the registered values to pinpoint the location of the locator transmitter.

In the example positioning system described above, each receiver antenna registers all three frequencies from the three transmitter antennae. Since the three antennae broadcast on different frequencies, the capacitance of programmable variable capacitor 1402 can be altered three times to register the amount of power each receiver antenna receives from each transmitting antenna, as opposed to having three separate receiver circuits and three different tuners, resulting in more compact circuitry.

Similarly, in order to have all five receiver antennae, but still only require a single receiver circuit, the antennae are each equipped with transistor switches, as shown in FIG. 16. When voltage source 1500, which is controlled by a separate circuit, has an output of 0V, the switch is "off", and the antenna attached to that particular transistor is not effectively connected to inductor coil 1400. Each of the five receiver antennae may be equipped with a voltage source similar to source 1500, and the voltages of the sources alternate periodically such that each antenna gets a "turn" being connected to inductor coil 1400 and therefore, the receiver circuit.

By systematically changing the capacitance of capacitor 1402 and the voltages from the 1500 sources, and using an algorithm designed to ascertain the signal strength at each frequency as received by each antenna, a receiver circuit designed in accordance with some embodiments may be used to find the strength of the signals received by each receiver antenna from each transmitter antenna. Assuming that the receiver antennas are configured to detect signals from the transmitters, processor 1405 may interpret the signals received, and solve a system of equations to determine the location of the transmitter.

Figure 18:
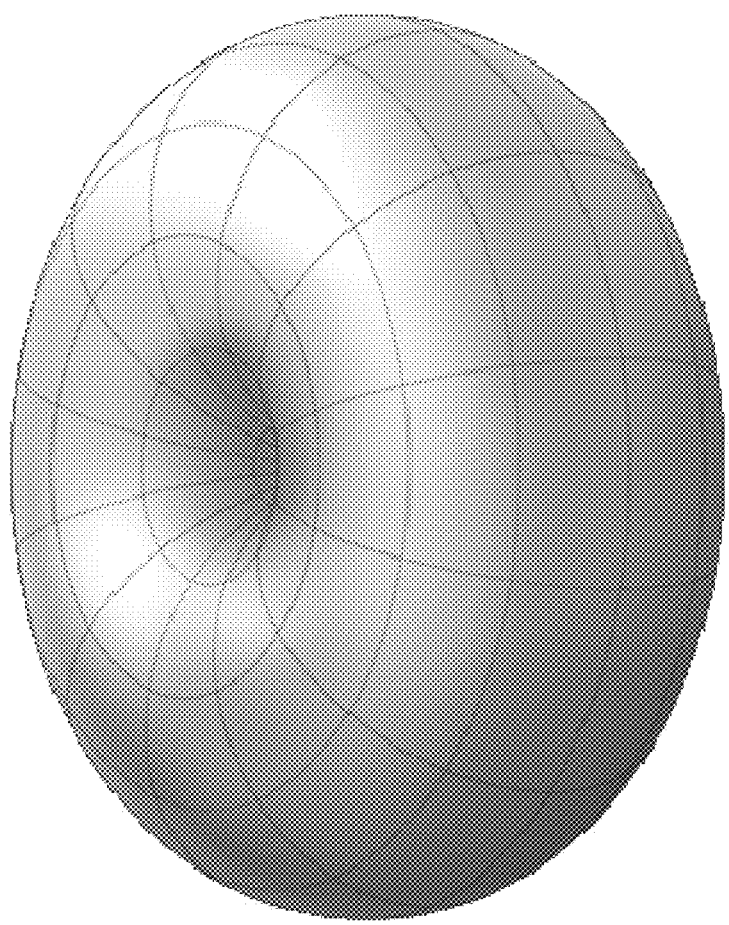
FIG. 18 shows a radiation pattern of a short dipole and small loop antennae that may be used in a locator transmitter and/or a locator receiver in accordance with some embodiments.

FIG. 18 shows the radiation pattern of short dipole and small loop antenna arranged in accordance with the configurations shown in FIGS. 14 and 17 discussed above. Based on the radiation pattern of the transmitter antennae, processor 1405 may determine the location of the transmitter in 3D space, based on the signal strengths coming from each toroidal radiation pattern.

FIG. 19 shows a system of equations that may be used by processor 1405 to determine the location of the locator transmitter. For the system of equations in FIG. 19, $E_R$ is the receiver circuit efficiency, $B_T$ is the transmitter gain constant, $B_R$ is the receiver gain constant, I is the transmitter intensity, and $(x_0, y_0, z_0)$ is the location of the transmitter relative to the receiver.

The system of equations shown in FIG. 19 results from how the transmitter and receiver antennae are configured. Assuming small levels of diffraction, reflection, or absorption between the transmitter and receivers, the equations shown in FIG. 19 operate under the assumption that the receiver is at the origin, and that the transmitter is at a point $(x_0, y_0, z_0)$ in space. In this particular example of the device, the receiver is only capable of locating the transmitter if it is "in front" of it, or rather, $z_0$ is always positive. Some embodiments include a directional antenna to provide more flexibility to locate transmitters behind the receiver. The equations shown in FIG. 19 above enable processor 1405 to determine where the location of the transmitter (i.e., location $(x_0, y_0, z_0)$ is, based on the different values of m, or rather, different received signal strengths.

Assuming the EMR power transmitter is directive, the EMR power receiver is only able to receive power if the receiver is in the path of the electron beam. Accordingly, the function of the positioning system is to locate the receiver in space and to direct the electron beam towards that location. Accordingly, in some embodiments the locator transmitter may be physically connected to the EMR power receiver, such that the two are in the same location in 3D space, and orienting device 1406 may be connected to the EMR power transmitter, such that it is able to control the direction in which the electron beam is directed.

Since the locator transmitter and the EMR power receiver are in the same location, and the locator receiver is able to determine the location of the transmitter, processor 1405 may be configured to direct orienting device 1406 to point the EMR power transmitter towards the locator transmitter, and therefore, the power receiver, provided that the locator receiver is within range of the transmitter.

Figure 20:
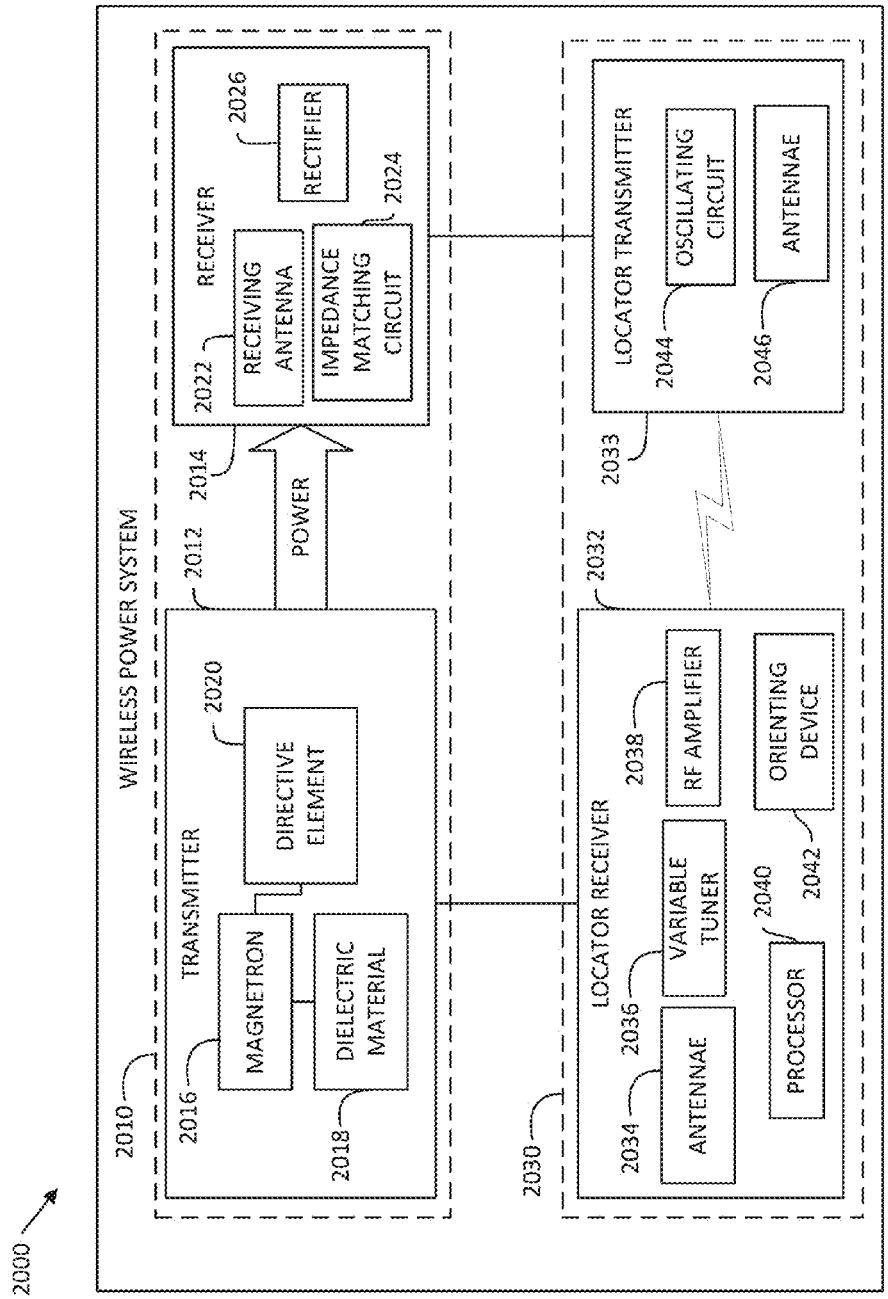
FIG. 20 shows a block diagram of a system for wireless power transfer in accordance with some embodiments.

FIG. 20 schematically illustrates components of a wireless power system 2000 in accordance with some embodiments. Wireless power system 2000 includes wireless power transfer system 2010 and positioning system 2030. The wireless power system 2010 includes a power transmitter 2012 configured to radiate electromagnetic radiation and power receiver 2014 configured to receive the electromagnetic radiation from the power transmitter 2012.

Power transmitter 2012 includes a magnetron 2016 having dielectric material 2018 associated therewith for tuning an output frequency of the magnetron 2016. Power transmitter 2012 also includes a directive element 202 arranged to focus a source of electromagnetic radiation generated by the magnetron 206 into an electron beam for transmission to power receiver 2014.

Power receiver 2014 includes a receiving antenna 2022 configured to receive the electron beam generated by power transmitter 2010, an impedance matching circuit 2024 configured to receive the output of receiving antenna 2022, and rectifier 2026 configured to convert the AC voltage output from impedance matching circuit 2024 into a DC voltage used to power a load.

Positioning system 2030 includes locator receiver 2032 co-located with power transmitter 2010 and locator transmitter 2033 co-located with power receiver 2014. Locator receiver 2032 is configured to determine the location of locator transmitter 2033 without the use of triangulation. Locator receiver 2032 includes antennae 2034 configured to detect signals transmitted by antennae 2046 of locator transmitter 2033. Locator receiver 2032 also includes variable tuner 2036, RF amplifier 2038, processor 2040, and orienting device 2042 configured to instruct power transmitter 2010 to direct the output electron beam to a location in space where the locator transmitter (and power receiver) is located. In addition to antennae 2046, locator transmitter 2033 also includes oscillating circuit 2044 coupled to antennae and configured to generate signals for transmission to locator receiver 2032.

Various techniques described herein may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments in detail, various modifications and improvements will readily occur to those skilled in the art. Accordingly, the foregoing description is by way of example only, and is not intended as limiting.

What is claimed is:

1. A wireless power system comprising:
    a wireless power transfer system comprising:
        a radiating power transmitter configured to output electromagnetic radiation, wherein the radiating power transmitter includes:
            a magnetron having a hole and slot type cavity configuration;
            a rectification circuit coupled to the magnetron, wherein the rectification circuit includes a diode bridge circuit and a reservoir capacitor coupled across first and second terminals of the diode bridge circuit, wherein the rectification circuit is configured to have a ripple factor less than 5% such that an output frequency bandwidth of the magnetron is less than 10 MHz;
            an auxiliary dielectric material arranged within a slot of the hole and slot type cavity of the magnetron, wherein the auxiliary dielectric material is provided in an amount such that an output frequency of the magnetron is less than 2.5 GHz; and
            a directive element configured to focus the electromagnetic radiation into a beam in a particular direction; and
        a power receiver including a rectenna configured to receive the beam output from the radiating power transmitter when incident on the power receiver; and
    a positioning system configured to orient the radiating power transmitter relative to the power receiver to enable the power receiver to receive at least a portion of the beam output from the radiating power transmitter, the positioning system comprising:
        a locator receiver coupled to the radiating power transmitter, wherein the locator receiver includes a first plurality of antennae, a variable tuner, an RF power amplifier, and a processor; and
        a locator transmitter coupled to the power receiver, wherein the locator transmitter includes a second plurality of antennae each of which is coupled to an independent oscillator circuit, wherein each of the second plurality of antenna is configured to broadcast on a different frequency, wherein the locator receiver is configured to wirelessly determine a location of the locator transmitter relative to a location of the locator receiver without using triangulation.

2. The wireless power system of claim 1, wherein the locator receiver further comprises an orienting device configured to orient the radiating power transmitter in a direction of the locator transmitter.

3. The wireless power system of claim 1, wherein the wireless power transfer system further comprises a circuit configured to vary the output power of the magnetron.

4. The wireless power system of claim 1, wherein the auxiliary dielectric material has a dielectric constant greater than 1.0006.

5. The wireless power system of claim 1, wherein the auxiliary dielectric material has a dielectric constant greater than 2.

6. The wireless power system of claim 1, wherein the auxiliary dielectric material has a dielectric constant greater than 5.

7. The wireless power system of claim 1, wherein the directive element comprises an elliptical radio telescope.

8. The wireless power system of claim 1, wherein wherein the auxiliary dielectric material is provided in an amount such that an output frequency of the magnetron is less than 148 MHz.

9. The wireless power system of claim 1, wherein wherein the auxiliary dielectric material is provided in an amount such that an output frequency of the magnetron is less than 108 MHz.

10. The wireless power system of claim 1, wherein the variable tuner includes a programmable variable capacitor, wherein the processor is programmed to alter a capacitance value of the programmable variable capacitor, and wherein the locator receiver is configured to wirelessly determine a location of the locator transmitter relative to a location of the locator receiver by:
    altering the capacitance value of the programmable variable capacitor to register an amount of power received by each of the first plurality of antennae from the second plurality of antennae; and
    determining the location of the locator transmitter based on the registered amount of power received by each of the first plurality of antennae.

* * * * *

UNITED STATES PATENT AND TRADEMARK OFFICE
CERTIFICATE OF CORRECTION

PATENT NO.        : 9,685,826 B1
APPLICATION NO.   : 15/291346
DATED             : June 20, 2017
INVENTOR(S)       : AbdurRahman Bhatti Page 1 of 1

It is certified that error appears in the above-identified patent and that said Letters Patent is hereby corrected as shown below:

In the Claims

In Claim 8, at Column 14, Line 25, "system of claim 1, wherein wherein the...." Should read -----system of claim 1, wherein the....-----.

In Claim 9, at Column 14, Line 29, "system of claim 1, wherein wherein the...." Should read -----system of claim 1, wherein the....-----.

Signed and Sealed this
First Day of August, 2017

Joseph Matal
*Performing the Functions and Duties of the*
*Under Secretary of Commerce for Intellectual Property and*
*Director of the United States Patent and Trademark Office*